(12) United States Patent
Reche (10) Patent No.: US 9,081,718 B2
(45) Date of Patent: Jul. 14, 2015

(54) SYSTEMS AND METHODS FOR STORING AND RECOVERING CONTROLLER DATA IN NON-VOLATILE MEMORY DEVICES

(71) Applicant: Micron Technology, Inc., Boise, ID (US)

(72) Inventor: Cory Reche, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 14/171,266

(22) Filed: Feb. 3, 2014

(65) Prior Publication Data

US 2014/0149788 A1 May 29, 2014

Related U.S. Application Data (63) Continuation of application No. 12/365,816, filed on Feb. 4, 2009, now Pat. No. 8,645,749.

(51) Int. Cl.
*G06F 11/00* (2006.01)
*G06F 11/10* (2006.01)

(52) U.S. Cl.
CPC ...... *G06F 11/108* (2013.01); *G06F 2211/1057* (2013.01); *G06F 2211/1059* (2013.01); *G06F 2211/1061* (2013.01)

(58) Field of Classification Search
USPC .......................................... 714/6.2, 6.21, 6.3
See application file for complete search history.

(56) References Cited

U.S. PATENT DOCUMENTS

| | | | | |
|---|---|---|---|---|
| 6,985,995 | B2 * | 1/2006 | Holland et al. | 711/114 |
| 7,386,765 | B2 * | 6/2008 | Ellis et al. | 714/42 |
| 7,493,485 | B2 * | 2/2009 | Chen et al. | 713/2 |
| 2005/0166087 | A1 * | 7/2005 | Gorobets | 714/7 |
| 2005/0283650 | A1 | 12/2005 | Zhang et al. | |
| 2008/0126879 | A1 | 5/2008 | Tiwari et al. | |
| 2008/0172523 | A1 | 7/2008 | Tanaka et al. | |
| 2008/0177998 | A1 | 7/2008 | Apsangi et al. | |
| 2009/0006745 | A1 | 1/2009 | Cavallo et al. | |
| 2009/0020608 | A1 | 1/2009 | Bennett et al. | |
| 2010/0017649 | A1 * | 1/2010 | Wu et al. | 714/6 |

OTHER PUBLICATIONS

Murph, D.; www.engadget.com20080108a-data-demoes-128gb-sata-raid-ssd ; weblogs, inc; pp. 1-3; Jan. 8, 2008.
http://en.wikipedia.org/wiki/RAID ;pp. 1-15.

* cited by examiner

*Primary Examiner* — Sarai Butler
(74) *Attorney, Agent, or Firm* — Fletcher Yoder, P.C.

(57) ABSTRACT

Systems and methods are disclosed for storing the firmware and other data of a flash memory controller, such as using a RAID configuration across multiple flash memory devices or portions of a single memory device. In various embodiments, the firmware and other data used by a controller, and error correction information, such as parity information for RAID configuration, may be stored across multiple flash memory devices, multiple planes of a multi-plane flash memory device, or across multiple blocks or pages of a single flash memory device. The controller may detect the failure of a memory device or a portion thereof, and reconstruct the firmware and/or other data from the other memory devices or portions thereof.

22 Claims, 9 Drawing Sheets

SYSTEMS AND METHODS FOR STORING AND RECOVERING CONTROLLER DATA IN NON-VOLATILE MEMORY DEVICES

CROSS-REFERENCE TO RELATED APPLICATION

This application is a continuation of U.S. patent application Ser. No. 12/365,816, which was filed on Feb. 4, 2009, now U.S. Pat. No. 8,645,749, which issued on Feb. 4, 2014.

BACKGROUND

1. Field of Invention

Embodiments of the invention relate generally to memory devices and more specifically to data management in non-volatile memory devices, such as NAND memory devices.

2. Description of Related Art

Electronic systems, such as computers, personal organizers, cell phones, portable audio players, etc., typically include one or more memory devices to provide storage capability for the system. System memory is generally provided in the form of one or more integrated circuit chips and generally includes both random access memory (RAM) and read-only memory (ROM). System RAM is typically large and volatile and provides the system's main memory. Static RAM and Dynamic RAM are commonly employed types of random access memory. In contrast, system ROM is generally small and includes non-volatile memory for storing initialization routines and identification information. Non-volatile memory may also be used for caching or general data storage. Electrically-erasable read only memory (EEPROM) is one commonly employed type of read only memory, wherein an electrical charge may be used to program data in the memory.

One type of non-volatile memory that is of particular use is a flash memory. A flash memory is a type of EEPROM that can be erased and reprogrammed in blocks. Flash memory is often employed in personal computer systems in order to store the Basic Input Output System (BIOS) program such that it can be easily updated. Flash memory is also employed in portable electronic devices, such as wireless devices, because of the size, durability, and power requirements of flash memory implementations. Various types of flash memory may exist, depending on the arrangement of the individual memory cells and the requirements of the system or device incorporating the flash memory. For example, NAND flash memory is a common type of flash memory device.

In systems or devices that use flash memory devices, the system, device, or flash memory device may include a controller that stores programs (e.g., firmware) and controller data in a portion of the flash memory device being controlled. During operation, the controller may load the programs and other data from the flash memory device and execute the programs to operate the memory device. Because these programs and data are stored in the flash memory device, the controller programs and data are subject to the same failure rate of the flash memory device. If a memory device fails, so that the controller programs and/or data is lost or inaccessible, the controller may no longer be able to control the memory device, causing a failure of the device and possible data loss of other data stored on the device.

DETAILED DESCRIPTION

Figure 1:
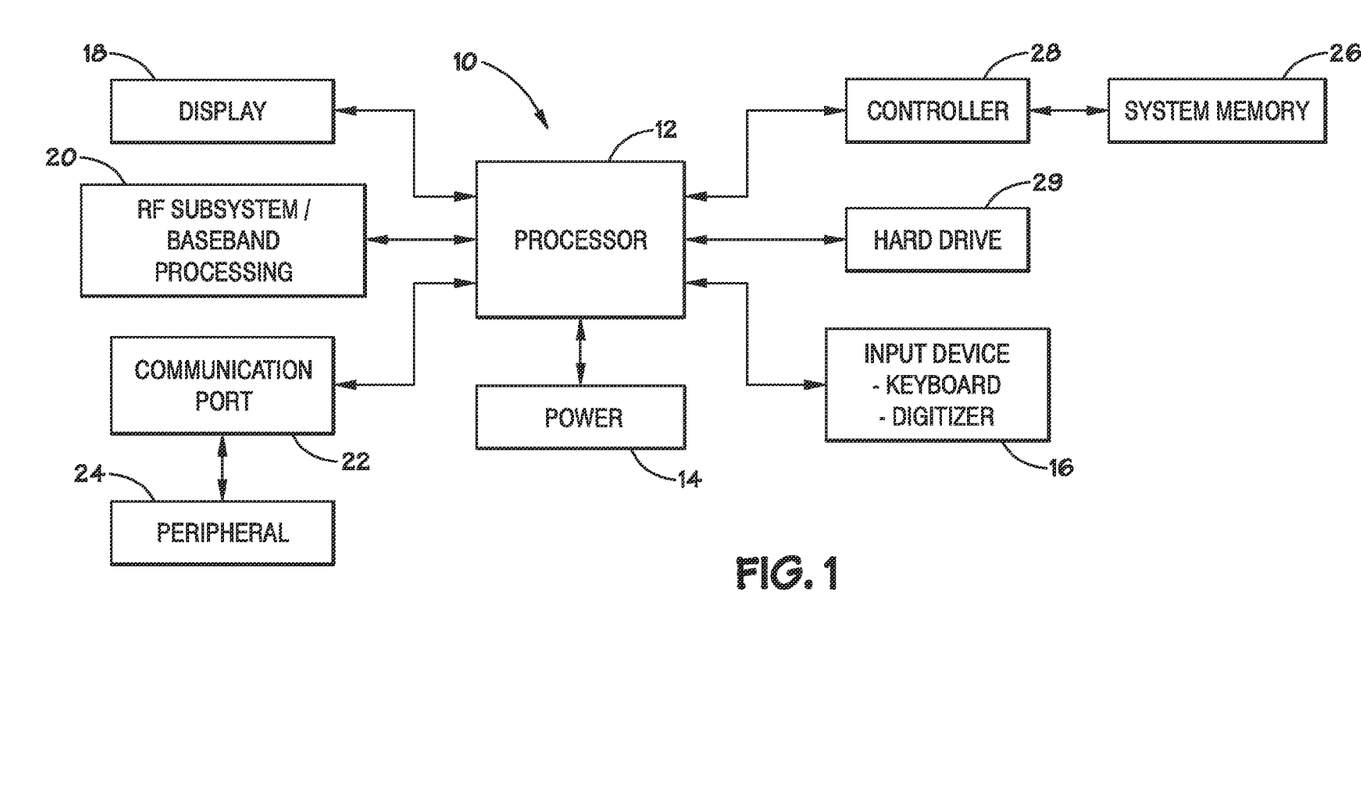
FIG. 1 illustrates a block diagram of an embodiment of a processor-based device having a memory that includes memory devices in accordance with embodiments of the present invention.

Turning now to the drawings, and referring initially to FIG. 1, a block diagram depicting an embodiment of a processor-based system, generally designated by reference numeral 10, is illustrated. The system 10 may be any of a variety of types such as a computer, pager, cellular phone, personal organizer, portable audio player, control circuit, camera, etc. In a typical processor-based device, a processor 12, such as a microprocessor, controls the processing of system functions and requests in the system 10. Further, the processor 12 may comprise a plurality of processors that share system control.

The system 10 typically includes a power supply 14. For instance, if the system 10 is a portable system, the power supply 14 may advantageously include permanent batteries, replaceable batteries, and/or rechargeable batteries. The power supply 14 may also include an AC adapter, so the system 10 may be plugged into a wall outlet, for instance. The power supply 14 may also include a DC adapter such that the system 10 may be plugged into a vehicle cigarette lighter, for instance.

Various other devices may be coupled to the processor 12 depending on the functions that the system 10 performs. For instance, a user interface 16 may be coupled to the processor 12. The user interface 16 may include buttons, switches, a keyboard, a light pen, a stylus, a mouse, and/or a voice recognition system, for instance. A display 18 may also be coupled to the processor 12. The display 18 may include an LCD, a CRT, LEDs, and/or an audio display, for example.

Furthermore, an RF sub-system/baseband processor 20 may also be coupled to the processor 12. The RF sub-system/baseband processor 20 may include an antenna that is coupled to an RF receiver and to an RF transmitter (not shown). A communications port 22 may also be coupled to the processor 12. The communications port 22 may be adapted to be coupled to one or more peripheral devices 24 such as a modem, a printer, a computer, or to a network, such as a local area network, remote area network, intranet, or the Internet, for instance.

Generally, the memory is coupled to the processor 12 to store and facilitate execution of various programs. For instance, the processor 12 may be coupled to system memory 26, which may include volatile memory, such as Dynamic Random Access Memory (DRAM) and/or Static Random Access Memory (SRAM). The system memory 26 may also include non-volatile memory, such as read-only memory (ROM), PC-RAM, silicon-oxide-nitride-oxide-silicon (SONOS) memory, metal-oxide-nitride-oxide-silicon (MONOS) memory, and/or flash memory (e.g., NAND memory, NOR memory, etc.) to be used in conjunction with the volatile memory.

As described further below, the system memory 26 may include one or more memory devices, such as flash memory devices, that may be operated in accordance with embodiments of the present invention. Such devices may be referred to as or include solid state drives (SSD's), MultimediaMediaCards (MMC's), SecureDigital (SD) cards, CompactFlash (CF) cards, or any other suitable device. Further, it should be appreciated that such devices may couple to the system 10 via any suitable interface, such as Universal Serial Bus (USB), Peripheral Component Interconnect (PCI), PCI Express (PCI-E), Small Computer System Interface (SCSI), IEEE 1394 (Firewire), or any other suitable interface. To facilitate operation of the system memory 26, such as the flash memory devices, the system 10 may include a memory controller 28, as described in further detail below. Additionally, the system 10 may include a hard drive 29, such as a magnetic storage device.

Figure 2:
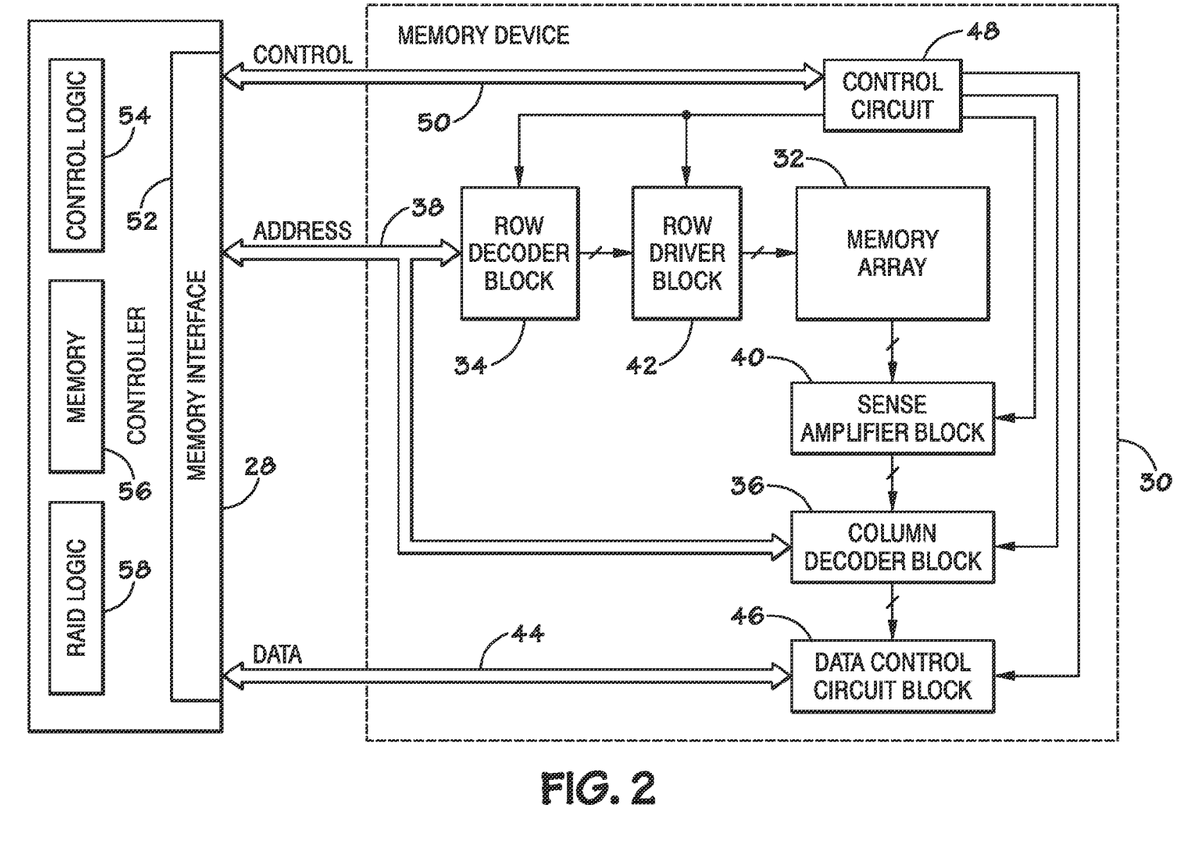
FIG. 2 illustrates a block diagram of an embodiment of a flash memory device having a memory array in accordance with embodiments of the present invention.

FIG. 2 is a block diagram illustrating a NAND flash memory device 30 that may be included as a portion of the system memory 26 of FIG. 1. FIG. 2 also depicts the memory controller 28 coupled to the memory device 30. The flash memory device 30 generally includes a memory array 32. The memory array 32 generally includes many rows and columns of conductive traces logically arranged in a grid pattern to form a number of memory cells. The lines used to select cells in the memory array 32 are usually considered the rows or "row lines," and are generally referred to as "wordlines." The lines used to sense (e.g., read) the cells are usually referred to as the columns or "column lines," and are generally referred to as "bit lines" or "digit lines." The size of the memory array 32 (i.e., the number of memory cells) will vary depending on the size of the flash memory device 30.

To access the memory array 32, a row decoder block 34 and a column decoder block 36 are provided and are configured to receive and translate address information from the controller 28 via the address bus 38 to access a particular memory cell in the memory array 32. A sense amplifier block 40 having a plurality of the sense amplifiers is also provided between the column decoder 36 and the memory array 32 to sense and amplify individual values stored in the memory cells. Further, a row driver block 42 is provided between the row decoder block 34 and the memory array 32 to activate a selected word line in the memory array according to a given row address.

During read and program operations, such as a write operation, data may be transferred to and from the flash memory device 30 from the controller 28 via the data bus 44. The coordination of the data and address information may be conducted through a data control circuit block 46. Finally, the flash memory device 30 may include a control circuit 48 configured to receive control signals from the controller 28 via the control bus 50. The control circuit 48 is coupled to each of the row decoder block 34, the column decoder block 36, the sense amplifier block 40, the row driver block 42 and the data control circuit block 46, and is generally configured to coordinate timing and control among the various circuits in the flash memory device 30.

As mentioned above, the controller 28 provides control signals over the control bus 50, address signals via the address bus 38, and data via the data bus 44, to the memory device 30. The controller may include a memory interface 52, control logic 54, memory 56 (such as registers) and striping and error control logic 58. The memory interface 52 enables the controller 28 to communicate with the memory device 30. The control logic 54 processes incoming requests and data, such as from the processor 12, and provides signals to the memory device 30 to perform the requests. Additionally, as described further below, RAID logic 58 enables the controller 28 to operate one or more memory devices 30, or portions of the memory array 32, in a RAID configuration, such that certain data and error correction information may be divided, replicated, and stored on multiple memory devices or portions thereof. More specifically, such dividing and storing may include striping firmware and operating data and storing error correction information. As mentioned above, in some embodiments the controller 28 may be a part of the processor 12 or may be a separate component.

Figure 3:
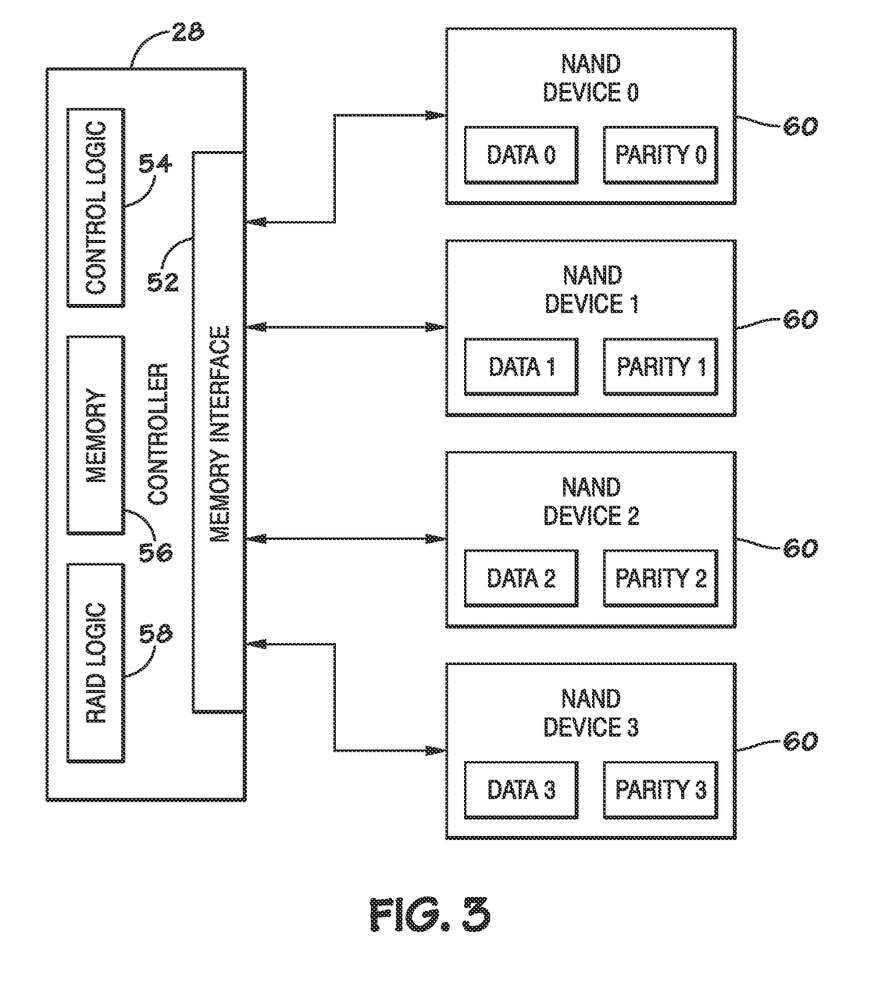
FIG. 3 depicts a controller and a plurality of NAND memory devices in a Redundant Array of Inexpensive Disks (RAID) configuration in accordance with an embodiment of the present invention.

FIG. 3 depicts a Redundant Array of Inexpensive Disks (RAID) configuration across multiple NAND memory devices in accordance with an embodiment of the present invention. The controller 28 may control and communicate with one or more NAND memory devices 60. In the depicted embodiment, four NAND memory devices 0, 1, 2, and 3 are included, but any number of NAND memory devices may be used. The memory controller 28 may communicate with components of the system 10 and the NAND memory devices 60, and may manage read, write, erase and any other requests to and from the memory devices 60.

The memory controller may include one or more programs executable by the controller 28 (e.g., firmware), and may include operating data associated with the programs, such as parameters of the memory devices 60 or other operating data. The firmware and operating data used by the controller 28 may be divided and stored on one or more of the memory devices 60 in a RAID configuration. Various levels of such RAID configurations may provide different levels of redundancy, performance, and data recovery for the firmware and operating data during operation of the controller 28 and memory devices 60.

The embodiment depicted in FIG. 3 illustrates use of the memory devices 60 in a RAID 5 configuration. RAID 5 offers striping with distributed parity, such that data and parity information is divided and stored across all memory devices 60. The firmware and other operating data of the controller 28 are striped across all memory devices, such that each memory device 60 stores a portion of the firmware and operating data of the controller 28. The firmware and operating data is illustrated by the Data0 region stored on memory device 0, the Data1 region stored on memory device 1, the Data2 region stored on memory device 2, and the Data3 region stored on memory device 3.

Additionally, parity information for the striped data (regions Data0, Data1, Data2, and Data3) is distributed on each memory device 60. The parity information is illustrated by the regions Parity0, Parity1, Parity2, and Parity3 stored on memory devices 0, 1, 2, and 3 respectively. By using the memory devices 60 in a RAID configuration, in the event of any failure of a single memory device 0, 1, 2, and 3 the controller 28 may recover of the firmware and operating data from the striped data and parity information of the other memory devices. In this manner, failure of a memory device 60 does not result in loss of the firmware and/or operating data of the controller 28, enabling the controller 28 to continue operating the remaining "good" (e.g., functioning) memory devices while ignoring the failed memory device. Additionally, after failure of a memory device 60, the firmware and operating data may be stored on the remaining "good" memory devices in another RAID configuration.

It should be appreciated that any version of RAID may be used with the memory devices 60. For example, RAID 6, which provides data striping with dual parity, may be used by providing another memory device 60. Similarly, other versions of RAID, such as RAID 2, RAID 3, RAID 4, or any other variant or nesting of these versions may be used in a NAND memory device configuration based on the number of memory devices 60 and the redundancy, performance, and data recovery desired.

Further, it should be appreciated that any data may be stored on the memory devices 60 in the RAID configurations discussed above. For example, in addition to firmware and other operating data, user data, program data, or any other data stored on the memory devices 60 by the processor 12 or other component of the system 10 may be stored on the memory devices 60 in any RAID configuration. In a RAID 5 configuration, for example, this other data would also be recoverable in the event of the failure of one of the memory devices 60.

Figure 4:
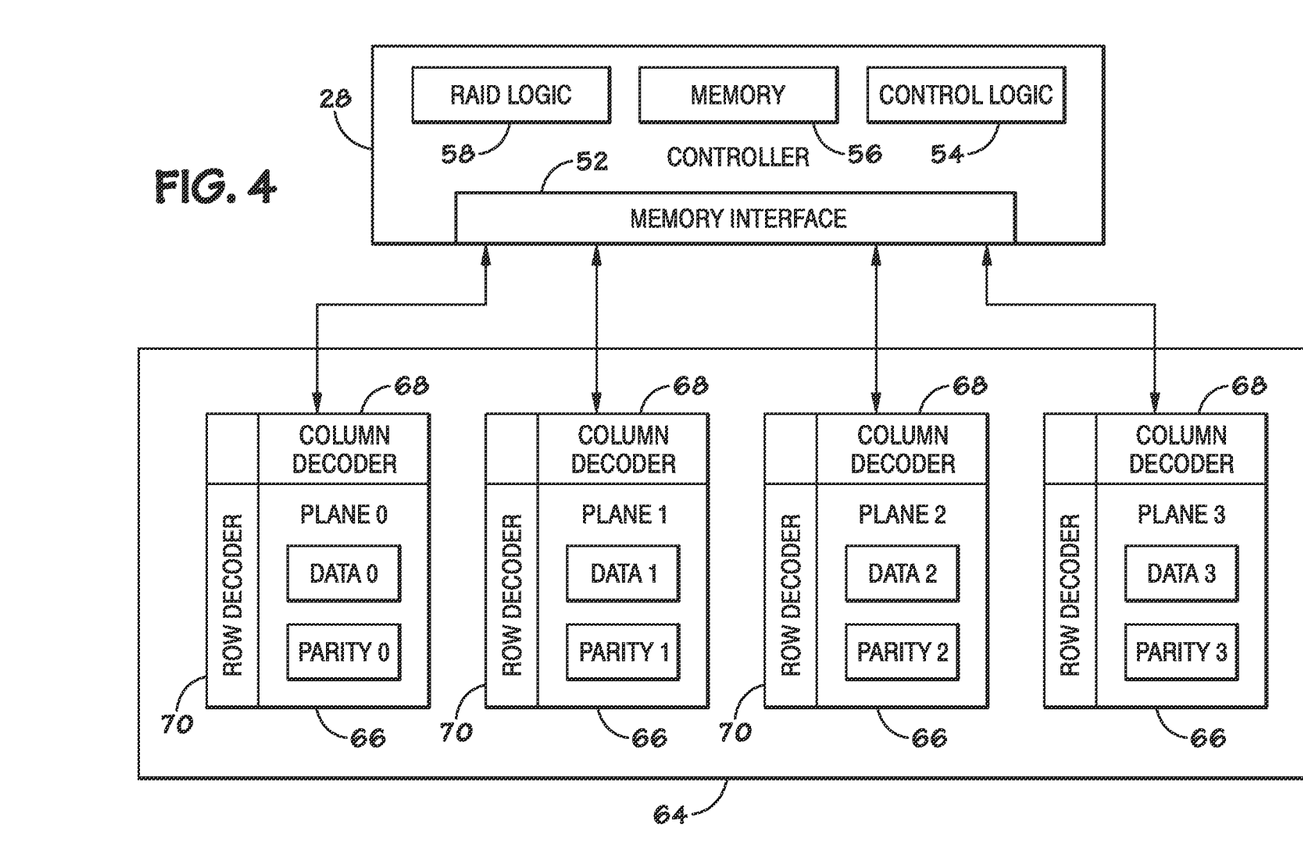
FIG. 4 depicts a controller and a multi-plane NAND memory device in a RAID configuration in accordance with an embodiment of the present invention.

In some embodiments, the system memory 26 may include a multi-plane NAND memory device. As illustrated in FIG. 4, such a system may include the memory controller 28 coupled to a multi-plane NAND memory device 64. The memory device 64 may include planes 66, depicted as planes 0, 1, 2, and 3. Each plane 66 may include a column decoder 68 and row decoder 70 to receive and translate address information from the controller 28 to each plane 66. Each plane 66 includes multiple blocks having multiple pages to store data.

As described above, the controller 28 may execute programs (e.g., firmware) and use operating data associated with such programs and stored on the memory device 64 when operating the memory device 64. Any failure of a plane 66 of the memory device 64 may cause failure of the controller 28 if the firmware or operating data is lost or unavailable.

The programs executable by the controller 28 (e.g., firmware) and operating data associated with the programs (and the controller 28) may be stored across the planes 66 in a RAID configuration. The embodiment depicted in FIG. 4 illustrates operation of the planes 66 in a RAID 5 configuration, enabling striping of the firmware and other data across the planes 66. Additionally, RAID 5 provides parity information across all planes 66. Planes 0, 1, 2, and 3 include regions Data0, Data1, Data2, and Data3 respectively, indicating portions of the firmware and operating data striped across the planes 66. Further, each plane 0, 1, 2, and 3 includes regions Parity0, Parity1, Parity2, and Parity3, representing parity information for the RAID 5 configuration stored on each plane 66.

By using RAID 5 to store firmware and operating data across the planes 66, the controller 28 ensures that the memory device 64 can continue operating after the failure of any plane 66. If one of the planes 66 fails, the firmware and operating data may be reconstructed from the remaining data and parity information on the "good" (e.g., functioning) planes 66. For example, if plane 0 fails, the firmware and operating data may be reconstructed from Data1, Data 2, and Data 3 and parity information Parity 1, Parity 2, and Parity 3. After the failure of a plane 66 and reconstruction of the firmware and operating data, the reconstructed data may be stored on the remaining "good" (e.g., functioning) planes in another RAID configuration.

It should be appreciated that a RAID configuration, such as RAID 2, RAID 3, RAID 4, RAID 5, and RAID 6 may be used in such an embodiment, depending on the number of planes 66 and the level of redundancy, data recovery, and performance desired. Further, it should be appreciated that other data may be stored on the planes 66 in any RAID configuration, so that user data, program data, or any other data stored on the memory device 64 may have the level of redundancy, data recovery, and/or performance offered by the RAID configuration.

Figure 5:
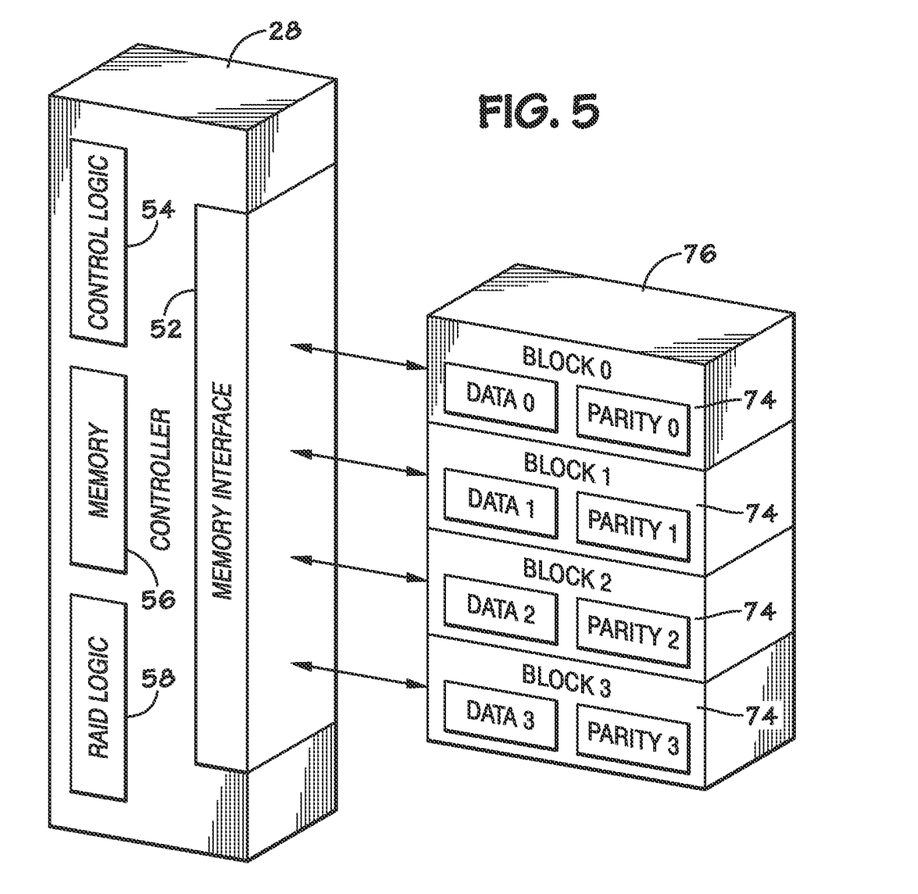
FIG. 5 depicts a controller and a plurality of blocks of a NAND memory device in a RAID configuration in accordance with an embodiment of the present invention.

As described above, the memory array of a NAND memory device may include blocks having multiple pages. FIG. 5 depicts a RAID configuration across multiple blocks 74 of a memory device 76 in accordance with an embodiment of the present invention. The controller 28 having RAID logic 58 and control logic 54, as discussed above, is coupled to the memory device 76. The RAID logic 58 of the controller 28 manages requests to the memory device 76 so that the data is stored in the blocks 74 according to a selected RAID configuration. It should be appreciated that other components, such as control circuits, row and column decoders, etc. may be included in the memory device 76 but are not shown in FIG. 5.

Similar to the embodiments discussed above, the programs executable by the controller (e.g., firmware) and operating data associated with the programs (and the controller 28) may be stored on the memory device 76. The failure of the memory device 76 may result in loss of the firmware and/or operating data used by the controller 28, rendering the memory device inoperable. Further, in some embodiments, the memory device 76 may include one plane, such that RAID configurations across multiple planes are not possible. In such an embodiment, firmware and operating data may be stored in a RAID configuration on the blocks 74 of a single plane of the memory device 76. Such an embodiment may also be used in the multi-plane memory device 64 if a RAID configuration across multiple planes is not desired.

As shown in FIG. 5, in a RAID 5 configuration, firmware and operating data may be striped across multiple blocks 74 of a plane 70 of the memory device 76. Each block 0, 1, 2, and 3 may include regions Data0, Data1, Data2, and Data3 respectively, represented striped data according to the RAID 5 configuration. Additionally, the regions Parity0, Parity1, Parity2, and Parity 3 depict parity information stored across blocks 0, 1, 2, 3, and 4 respectively. If a failure in one of the blocks 74 occurs, the firmware and operating data may be reconstructed from the data and parity information stored in the remaining "good" (e.g., functioning) blocks. For example, if block 0 fails and is no longer accessible by the controller, the firmware and operating data may be reconstructed from Data1, Data1, and Data2 and parity information Parity1, Parity2, and Parity3.

As discussed above, it should be appreciated that other embodiments may use other RAID configurations, such as RAID 2, RAID 3, RAID 4, RAID 5, and RAID 6, depending on the number of blocks used. For example, a RAID 6 configuration may be used with five blocks 74 of the plane 70, providing data striping with dual parity, such that a failure of two blocks may be recoverable.

Figure 6:
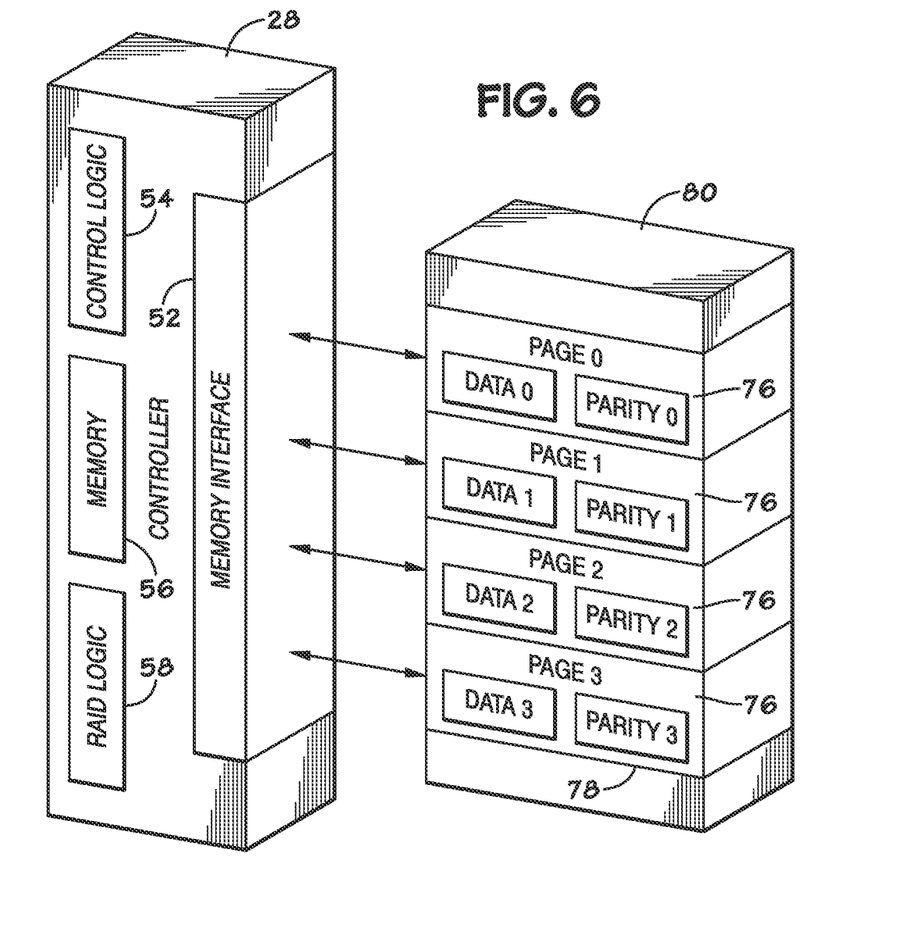
FIG. 6 depicts a controller and a plurality of pages of a NAND memory device in a RAID configuration in accordance with an embodiment of the present invention.

Each block of a NAND memory device includes multiple pages. FIG. 6 depicts use of a RAID configuration across multiple pages 76 of a block 78 of a memory device 80. The system in FIG. 6 includes the controller 28 coupled to the memory device 80 to manage requests to and from the device 80. It should be appreciated that each page 0, 1, 2, and 3 illustrated in FIG. 6 may correspond to one or more pages, as a unit of data stored in the memory device 80 may span multiple pages. Further, it should be appreciated that the controller 28 is capable of remapping a logical block of data from a component of the system 10 to the pages of a block of the memory device 80. For example, multiple logical blocks (e.g., 512 byte sectors) of the hard drive 29 may be mapped to a page of the memory device 80. The pages of the memory device 80 may be 512 bytes, 2,048, or 4,096 bytes in size.

As described above, the programs executable by the controller (e.g., firmware) and operating data associated with the programs (and the controller 28) are stored in the memory device 80. The firmware and operating data of the controller may be stored in a RAID configuration across multiple pages 76 of a block 78 of the memory device. For example, in a RAID 5 configuration, as illustrated in FIG. 6, the firmware and operating data may be striped across multiple pages 76 of a block 78, such that each page 0, 1, 2, and 3 stores striped data Data0, Data1, Data2, and Data3. Additionally, as provided by a RAID 5 configuration, parity data Parity0, Parity1, Parity2, and Parity3 may be stored across pages 0, 1, 2, 3, and 4 respectively.

In the event of a failure of one of the pages 76, the firmware and operating data may be reconstructed from the data and parity information stored in the remaining "good" (e.g., functioning) pages. For example, if page 1 fails and data stored on page 1 is no longer accessible, the firmware and other data may be reconstructed from Data0, Data2, and Data3, and parity information Parity0, Parity2, and Parity3. Once the firmware and operating data is reconstructed by the controller 28, the restored data can be stored on different pages of the memory device 80 in a RAID configuration, restoring redundancy and data recovery for the reconstructed data.

Again, it should be appreciated that a RAID configuration, such as RAID 2, RAID 3, RAID 4, RAID 5, and RAID 6, may be used with the embodiment disclosed in FIG. 6, depending on the number of pages used and level of redundancy, data recovery, and performance desired. Additionally, any type of data, such as user data, program data, etc., may be stored in a RAID configuration across the pages 76 of a block 78 of the memory device 80. Further, different data may be stored in multiple RAID configurations of pages, such that the firmware and operating data is stored in a first group of pages arranged in a first RAID configuration, and other data is stored in a second group of pages arranged in a second RAID configuration, and so on.

Figure 7:
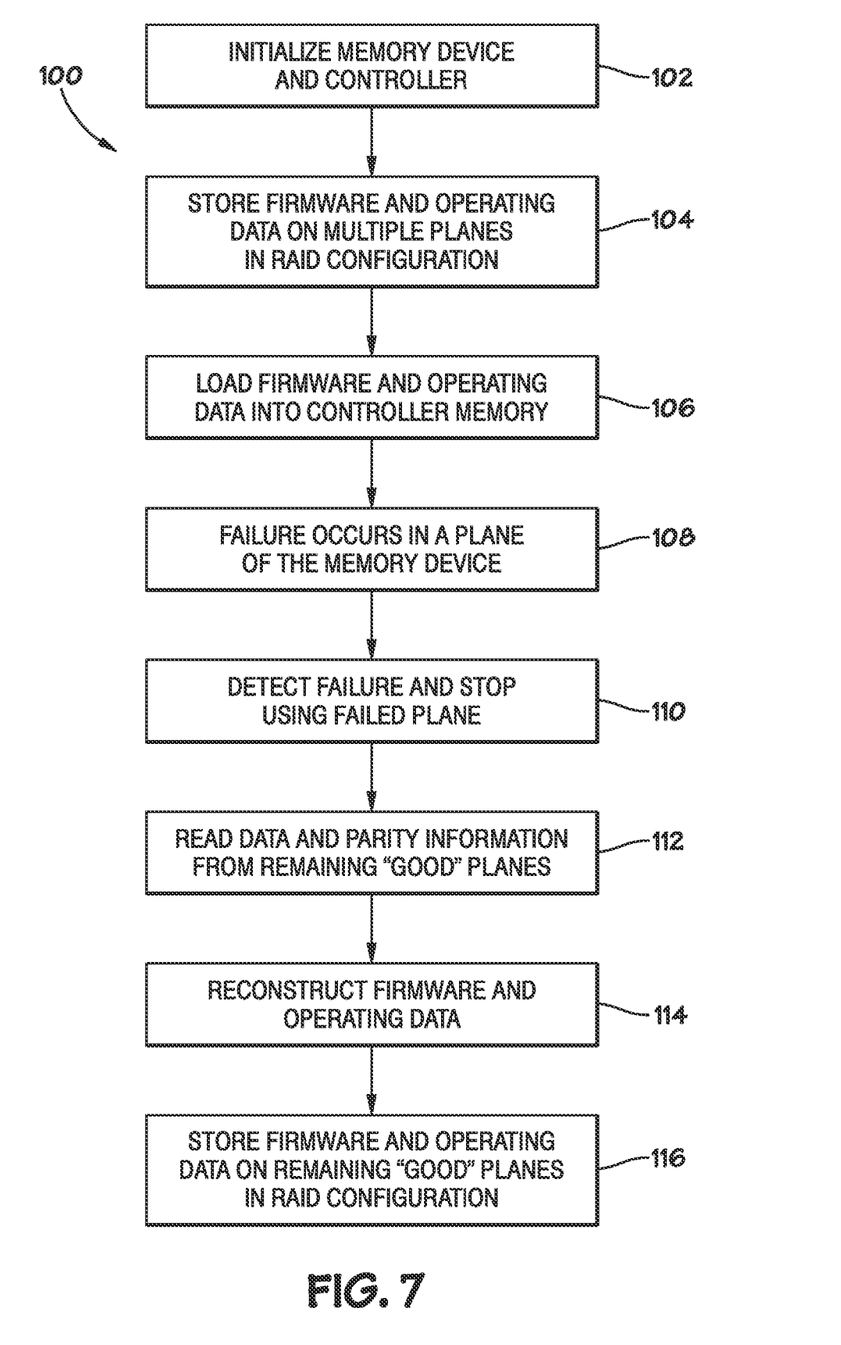
FIG. 7 is a flowchart of a process for operating a multi-plane NAND memory device in a RAID configuration in accordance with an embodiment of the present invention.

FIG. 7 illustrates an embodiment of a process 100 for operating a multi-plane NAND memory device in a RAID configuration, such as illustrated in FIG. 4. Upon initialization of the memory device 64 and controller 28 (block 102), the firmware and operating data for the controller 28 may be stored across multiple pages of the memory device 64 in a RAID configuration (block 104), such as RAID 5. As described above, each plane includes striped data and parity information for the stored data. The controller 28 may then load the firmware and operating data into the memory 56 of the controller 28 (block 106), such that the controller 28 may execute the firmware operate the memory device.

As shown in block 108, a failure may occur in one of the planes storing the firmware and operating data. The controller 28 detects the failure and stops using that failed plane (block 110). The controller 28 may then read the data and parity information from the remaining good planes (block 112). The controller 28 can then reconstruct the firmware and operating data from the striped data and parity information (block 114). After the information is reconstructed, the controller 28 can then store the information on the remaining "good" (e.g., functioning) planes, using any RAID configuration possible with the remaining number of planes (block 116).

Figure 8:
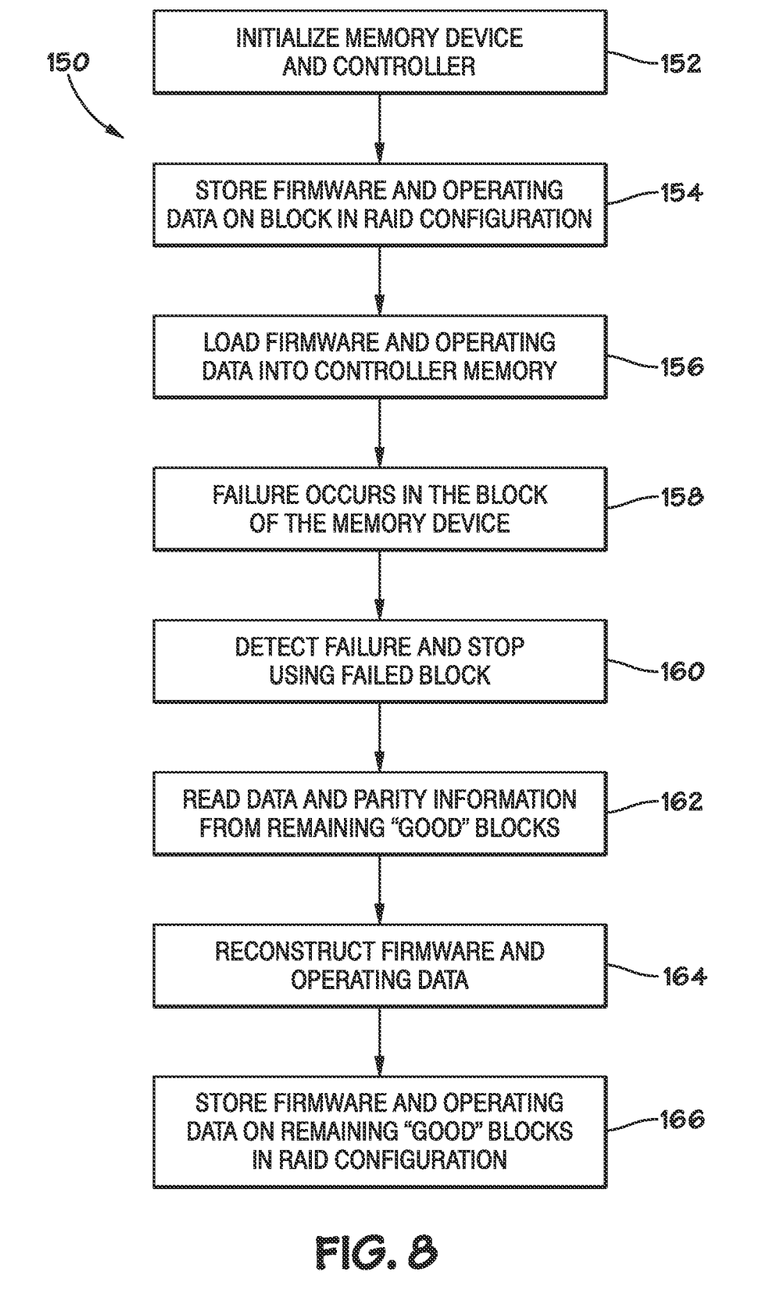
FIG. 8 is a flowchart of a process for operating blocks of a NAND memory device in a RAID configuration in accordance with an embodiment of the present invention.

FIG. 8 depicts an embodiment of a process 150 for operating a RAID configuration across blocks of a NAND memory device, such as illustrated in FIG. 5. After initialization of the memory device 76 and controller 28 (block 152), the program executable by the controller 28 (e.g., firmware) and operating data associated with the program (and the controller 28) may be stored across multiple blocks of the memory device 76 in a RAID configuration (block 154), such as RAID 5. As described above, each block includes striped data and parity information for the stored data. The controller 28 may then load the firmware and operating data into the memory 56 of the controller 28 (block 156), such that the controller 28 may execute the firmware operate the memory device.

As shown in block 158, during operation of the memory device 28, a failure may occur in one of the blocks of the NAND memory device 28 that stores the firmware and operating data. The controller 28 may detect the failure and cease reading and writing to the failed block (block 160). The controller 28 reads the striped data and parity information from the remaining "good" (e.g., functioning) blocks (block 162) and reconstructs the firmware and operating data from the striped data and parity information (block 164). The reconstructed data may be saved to another group of blocks in another RAID configuration, restoring the redundancy and data recovery of the stored data (block 166).

Figure 9:
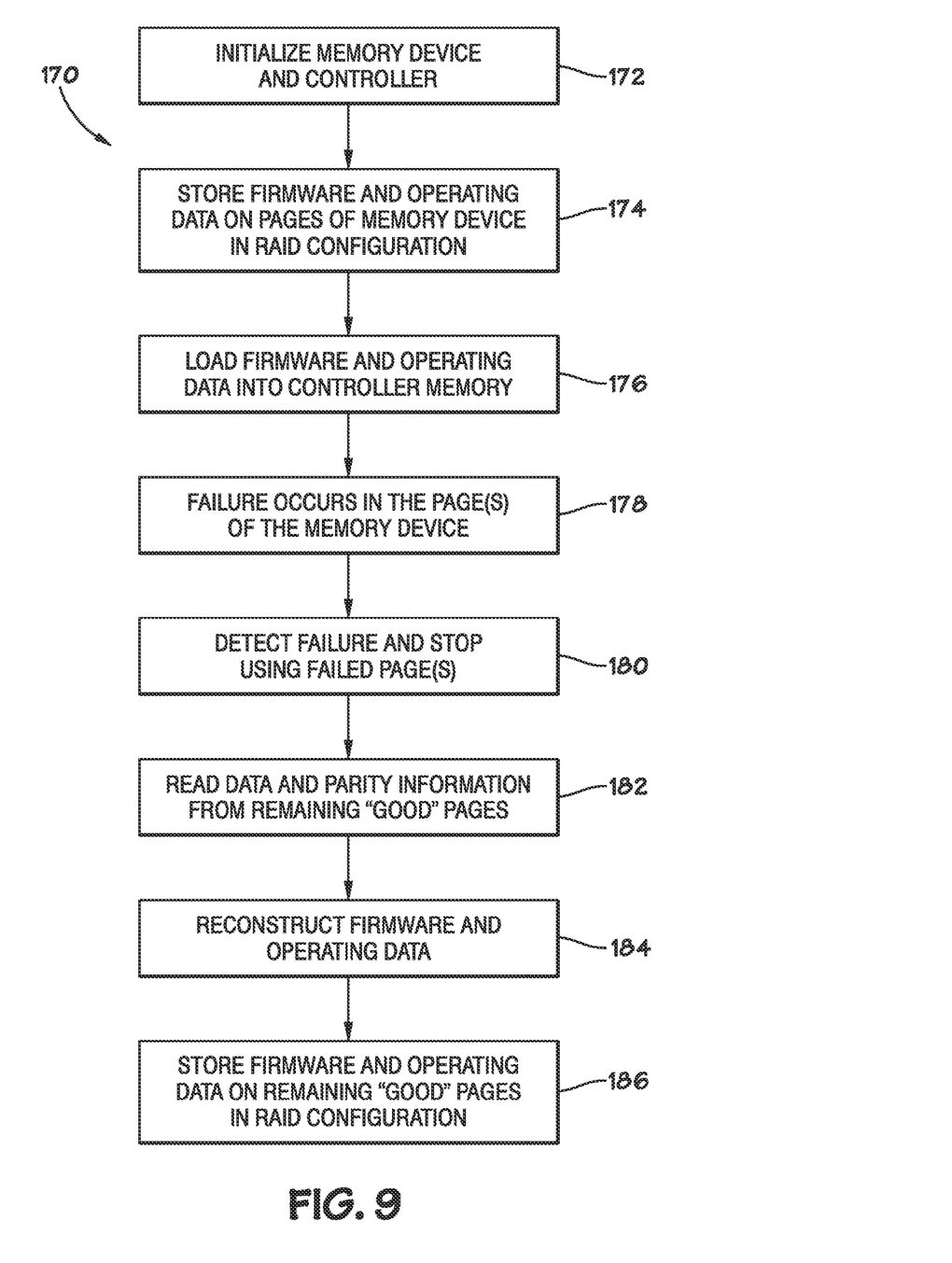
FIG. 9 is a flowchart of a process for operating pages of a NAND memory device in a RAID configuration in accordance with an embodiment of the present invention.

FIG. 9 depicts an embodiment of a process 170 for operating a RAID configuration across pages of a NAND memory device, as illustrated in FIG. 6. After initialization of the controller 28 and the memory device 80 (block 172), the program executable by the controller 28 (e.g., firmware) and operating data associated with the program (and the controller 28) may be stored across multiple pages of the memory device 80 in a RAID configuration, such that each page or group of pages includes striped data and parity information for the stored data. The controller 28 may load the firmware and operating data into the memory 56 of the controller 28 (block 174), such that the controller may execute the firmware operate the memory device.

As shown in block 178, failure may occur in a page or group of pages storing the firmware and operating data. After detection of the failure, the controller may stop writing to the failed page or group of pages (block 180). The controller 28 reads the striped data and parity information from the remaining pages (block 182), and reconstructs the firmware and operating data (block 184). After reconstructing the data, the controller may use a different group of pages to store the restored firmware and operating data (block 186).

It should be appreciated that, in other embodiments, the techniques described above may be applied to other types of non-volatile memory devices, such as NOR flash memory and Silicon-Oxide-Nitride-Oxide-Silicon (SONOS) memory. Further, as stated above, a RAID configuration may be used in embodiments implementing these techniques. Selection of the RAID configuration for a particular embodiment may include the level of redundancy, performance, and data recovery desired. Further, such benefits may be weighed against any disadvantages of the application of such a RAID configuration, such a decrease in reading and writing speed, increased power usage, and shortened life of the memory device (as a result of the increased number of rewrites in a RAID configuration).

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A memory controller configured to access portions of at least one of: a program executable by the memory controller from multiple predetermined segmented portions of a memory device or operating data associated with the program executable by the memory controller from the multiple predetermined segmented portions of the memory device.

2. The memory controller of claim 1, wherein the memory controller comprises redundant array of inexpensive disks (RAID) logic configured to manage requests to the memory device so that data is stored in the multiple predetermined segmented portions of the memory device in a RAID configuration.

3. The memory controller of claim 1, wherein the memory controller comprises control logic configured to processes incoming requests and incoming data as well as provide signals to the memory device to perform the requests.

4. The memory controller of claim 3, wherein the memory controller comprises a memory interface configured to transmit the signals to the memory device to perform the requests.

5. The memory controller of claim 1, wherein the memory controller is configured to store the portions across multiple planes of the memory device as the predetermined segmented portions of the memory device.

6. The memory controller of claim 1, wherein the memory controller is configured to store the portions across multiple blocks of the memory device as the predetermined segmented portions of the memory device.

7. The memory controller of claim 1, wherein the memory controller is configured to store the portions across multiple pages of the memory device as the predetermined segmented portions of the memory device.

8. The memory controller of claim 1, wherein the memory controller is configured to store the portions across multiple predetermined portions of multiple memory devices as the predetermined segmented portions of the memory device.

9. A memory controller configured to access multiple predetermined segmented portions of a memory device to retrieve firmware utilized by the memory controller to operate the memory device, wherein the memory controller is configured to divide and store the firmware across the multiple predetermined segmented portions of the memory device.

10. The memory controller of claim 9, wherein the memory controller comprises redundant array of inexpensive disks (RAID) logic configured to divide and store the firmware across the multiple predetermined segmented portions of the memory device in a RAID configuration.

11. The memory controller of claim 9, wherein the memory controller is configured to determine whether a portion of the divided firmware is inaccessible.

12. The memory controller of claim 11, wherein the memory controller is configured to reconstruct the portion of the divided firmware based on remaining accessible portions of the divided firmware stored across the multiple predetermined segmented portions of the memory device when the portion of the divided firmware is inaccessible.

13. The memory controller of claim 9, wherein the memory controller is configured to access the firmware across multiple predetermined portions of multiple memory devices as the predetermined segmented portions.

14. A memory controller configured to determine whether a portion of a program executable by the memory controller and stored across multiple predetermined segmented portions of a memory device is inaccessible and to reconstruct the portion of the program based on remaining accessible portions of the program stored across the multiple predetermined segmented portions of the memory device.

15. The memory controller of claim 14, wherein the memory controller is configured to store the reconstructed portion of the program in an accessible portion of the memory device.

16. The memory controller of claim 14, wherein the memory controller is configured to reconstruct the portion of the program based on parity data in conjunction with the remaining accessible portions of the program stored across the multiple predetermined segmented portions of the memory device.

17. The memory controller of claim 14, wherein memory controller is configured to execute the program to operate the memory device.

18. The memory controller of claim 14, wherein the memory controller is configured to store the portion across multiple predetermined portions of multiple memory devices as the multiple predetermined segmented portions of the memory device.

19. A memory controller configured to access a memory device to retrieve firmware from multiple predetermined segmented portions of the memory device, wherein the firmware is associated with the operation of the memory controller.

20. The memory controller of claim 19, wherein the memory controller is configured to access error correction information associated with the firmware and stored across the multiple predetermined segmented portions of the memory device.

21. The memory controller of claim 20, wherein the memory controller is configured to determine whether a portion of the firmware is inaccessible and reconstruct the portion of the firmware based on remaining accessible portions of the firmware and the error correction information associated with the accessible portions of the firmware.

22. The memory controller of claim 19, wherein the memory controller is configured to access the firmware across multiple predetermined portions of multiple memory devices as the predetermined segmented portions.

* * * * *